J. ZIHLMANN.
Method of Making Tumblers and Other Glass Articles.

No. 214,863. Patented April 29, 1879.

UNITED STATES PATENT OFFICE.

JOSEPH ZIHLMANN, OF BELLAIRE, OHIO.

IMPROVEMENT IN THE METHODS OF MAKING TUMBLERS AND OTHER GLASS ARTICLES.

Specification forming part of Letters Patent No. 214,863, dated April 29, 1879; application filed March 19, 1879.

*To all whom it may concern:*

Be it known that I, JOSEPH ZIHLMANN, of Bellaire, in the county of Belmont and State of Ohio, have invented certain new and useful Improvements in Making Tumblers and other like Glass Articles; and I do hereby declare the following to be a full, clear, and exact description of the invention, such as will enable others skilled in the art to which it pertains to make and use it, reference being had to the accompanying drawings, which form part of this specification.

My invention relates to the manufacture of tumblers and other similar glass articles, and is designed to provide a method for smoothing the cut edges of the same, so that the work may be accomplished in a better and a quicker manner than has previously been the case.

Heretofore the method and apparatus for carrying the same into effect have been as follows: A stone, sometimes as large as two and one-half feet in diameter, and mounted on an iron shaft, has been rotated by suitable means, and the tumblers have been held in the hand of an operator so as to place their edges in contact with the flat working-face of the stone, on which latter they are turned slowly. This manner of operation levels and smooths the tumbler's edge imperfectly, for the reason that as the stone rotates its flat working-face tends to throw the tumbler from the center toward the periphery of the stone; and, also, the grain of the stone, coming and going, tends to break a light form of tumbler and to chip a heavy form.

My invention consists, first, in a method whereby the tumbler is itself rotated by any suitable means while its edge is subjected to the action of a stone held in the hand of the operator, and formed with a concave working-face; second, in a method whereby the tumbler is rotated in a turning-lathe or other mechanical device while its edge is acted upon by a stone held in the hand of the operator, and formed with a through-hole in its concave working-face; third, in a method whereby the tumbler, provided with a wet sponge held therein, is rotated while its edge is acted upon by a stone disk turned slowly in the hand of the operator, and having a through-hole formed in the central portion of its concave working-face.

Figure 1:
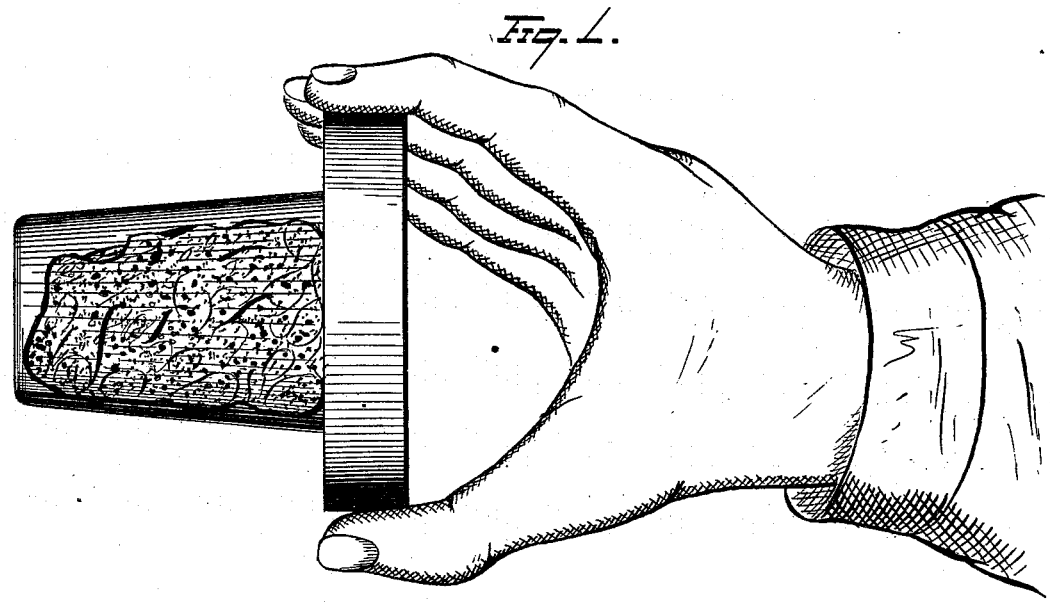
Figure 2:

Referring to the drawings, Figure 1 is a view representing my invention as in practice. Fig. 2 is a transverse sectional view of the stone disk in detail.

The manner of my operation is very simple, and consists in rotating the tumbler or other glass article by any suitable mechanical device. In practice I have found an ordinary turning-lathe to answer every purpose, and hence I prefer the same for this use. A wet sponge is placed within the tumbler, and then the stone, held in the operator's hand, is presented against the cut edge of the tumbler and turned slowly. This stone may be of any convenient size, and has its working-face formed concave, the central portion thereof being provided with a circular hole of suitable diameter. This working-face is made perfectly smooth, and is applied to the tumbler's edge by being turned in the hand so as to work from its center out to its periphery. The mouth of the tumbler is opposite, or has some portion in line with, the hole in the stone, so that the water from the wet sponge can find ready passage in escape through said hole; hence this water evolved from the sponge is not thrown over the person and dress of the operator, as would be the case if there were no hole formed in the stone. This hole also serves to render the stone lighter in weight and smaller in the area of its working-face.

Having fully described my invention, what I claim as new, and desire to secure by Letters Patent, is—

1. A method for smoothing the edge of a tumbler or similar glass article, consisting in rotating said article and subjecting its edge to the action of a stone held in the hand of the operator, said stone being formed with a concave working-face, substantially as set forth.

2. A method for smoothing the edge of a tumbler or other similar glass article, consisting in rotating said article by suitable mechanical means and subjecting its edge to the action of a stone held in the hand of operator, said stone being formed with a concave working-face having a through-hole therein, substantially as set forth.

3. A method for smoothing the edge of a tumbler or other similar glass article, consisting in providing said article with a wet sponge, held therein, rotating the same, and subjecting its edge to the action of a stone disk turned slowly in the hand of the operator, said disk being formed with a concave working-face having a through-hole in its central portion, substantially as set forth.

In testimony that I claim the foregoing I have hereunto set my hand this 17th day of March, 1879.

JOSEPH ZIHLMANN.

Witnesses:
  WM. H. TALLMAN,
  D. THEOBOLD.